Roberts & Graham.
Transplanting Implement.
№ 103,082. Patented May 17, 1870.

Witnesses:
Geo. H. Manchester
Harry S. Sprague

Inventors:
E. B. Roberts
W. Graham
Per attorney
Thos. S. Sprague

United States Patent Office.

EDWIN B. ROBERTS AND WILLIAM GRAHAM, OF STURGIS, MICHIGAN.

Letters Patent No. 103,082, dated May 17, 1870.

IMPROVEMENT IN TRANSPLANTING IMPLEMENT.

The Schedule referred to in these Letters Patent and making part of the same

*To whom it may concern:*

Be it known that we, EDWIN B. ROBERTS and WILLIAM GRAHAM, of Sturgis, in the county of St. Joseph and State of Michigan, have invented a new and useful Improvement in Transplanting Implements; and we do declare that the following is a true and accurate description thereof, reference being had to the accompanying drawings and to the letters of reference marked thereon, and being a part of this specification, in which—

Similar letters of reference indicate corresponding parts in each figure.

Figure 1:
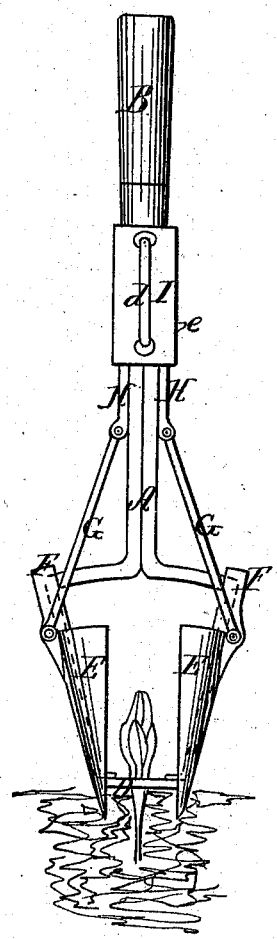
Figure 1 is an elevation of our device, open, ready for insertion.
Figure 2:
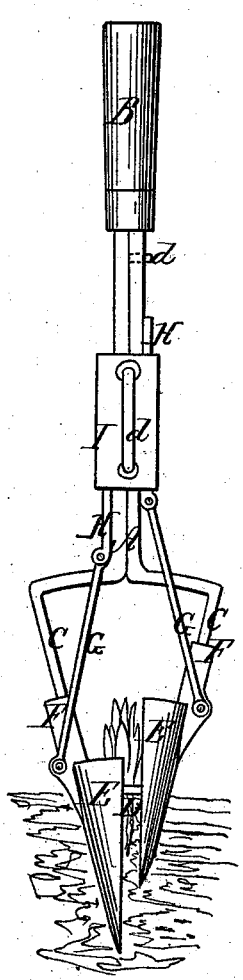
Figure 2 is an elevation of the same partially inserted.

The nature of this invention relates to an improvement in the construction of transplanting implements; and consists in the peculiar construction and arrangement of a pair of curved and pointed blades, and their attachments, in such a manner that the blades are successively caused to enter the earth and close about the roots of the plant, when the latter may be taken up and replanted in another place, by inserting the closed blades in the ground, opening and withdrawing them, leaving the plant in its new location with a quantity of earth in which it grew surrounding its roots.

In the drawings—

A represents a rectangular stock, of metal, bifurcated at its lower end, and provided with a suitable handle, B.

C are guides, projecting downward from the bifurcations and converging toward a prolongation of the line of the stock A, not meeting, however, but having secured to and between their ends an elliptical open plate, D, through which passes the foliage of the plant to be extracted.

E are blades, in the form of curved and pointed shovels, secured to slides F, embracing and reciprocating on the guides C.

The edges of the blades are parallel with the center line of the stock, so that, when extended downward, they close against each other.

G are links, connecting the slides with the slotted plates H, sliding on either side of the stock, within a sleeve, I, moved up or down the stock by means of a stirrup, *a*.

Figure 4:
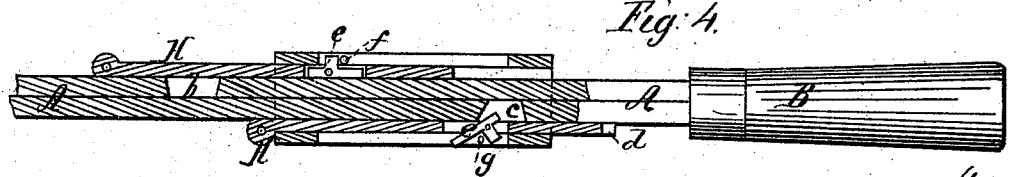
Figure 4 is a section of the stock and sleeve and their attachments.

*b c* are recesses in the sides of the stock, disposed as shown in fig. 4.

*d* is a stop in the stock, to prevent a further passage of the plate H upward on that side, while the other plate and the sleeve are arrested by the handle.

*e* is a three-armed ratchet, pivoted in a slot in each of the plates H, but in opposite directions to each other.

A long slot extends nearly the length of the sides of the sleeve, one having a cross-bar, *f*, in it near its lower end, and the other a similar bar, *g*, near its upper end.

The operation of the implement is as follows.

Draw up the sleeve as shown in fig. 1, when the blades will be raised and apart. The blade D is then passed down over the plant and rests on the ground. Placing the foot in the stirrup, and pressing it down on the stock, the body of the ratchet *e* on one side being held down by the cross-bar *f*, the plate H is carried down by it, and through it the blade to which it is connected, while the head of the other ratchet enters the recess *c*, and its opposite end or lever projects out through the slot in the sleeve. Consequently the plate H and blade of that side remain stationary.

Figure 3:
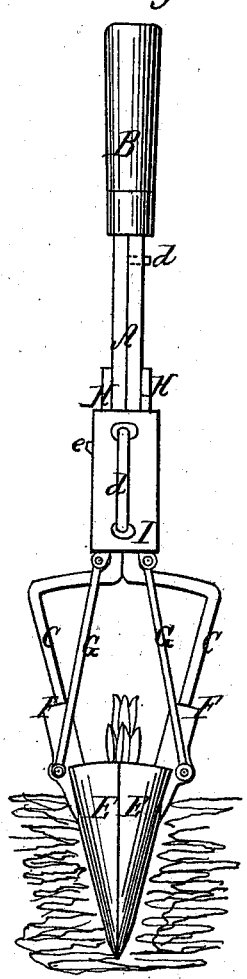
Figure 3 is an elevation of the same inserted, with the blades closed about the plant ready to remove it.

During this time the other blade has been inserted its length in the earth about one side of the plant, and, as its ratchet has reached the recess, its head enters, allowing the plate to remain stationary while the sleeve moves on. At this time the cross-bar in the slot at the other side of the sleeve, coming in contact with the projecting lever of its ratchet, presses it in, throwing out its head against the end of the slot, when the plate and blade of that side are forced down into the position shown in fig. 3, inclosing the roots of the plant with the surrounding earth, when the implement is withdrawn with its contents and conveyed to the desired location, and inserted to the proper depth, when the blades are withdrawn in the manner described, and the plant left in its new location with the earth in which it grew surrounding its roots.

The purpose we have in causing the blades to enter successively is that they can thereby close together. If they entered together, the earth would be compressed between them, and they could not be closed.

The advantages resulting from the use of this implement will be readily perceived, particularly in the cultivation of cotton, where a perfect stand may be made by transplanting to unseeded rows, and in replacing plants killed by the cut-worms with fresh ones.

What we claim as our invention, and desire to secure by Letters Patent, is—

1. In transplanting implements, the employment of a pair of alternating curved blades, E, substantially as and for the purpose set forth.

2. In combination with the blades E above described, the mechanism by which an alternating movement is given to said blades, consisting of the bifurcated stock A, provided with recesses $b$ $c$, stop $d$, guides C, open plate D, slides F, links G, slotted plates H, ratchets $e$, and slotted sleeve I, provided with cross-bars $f$ $g$, when said parts are constructed and arranged as and for the purpose set forth.

EDWIN B. ROBERTS.
WILLIAM GRAHAM.

Witnesses:
H. F. EBERTS,
HARRY S. SPRAGUE.